United States Patent [19]
Vlaar

[11] Patent Number: 5,321,755
[45] Date of Patent: Jun. 14, 1994

[54] INFORMATION-ENCRYPTING DEVICE AND METHOD

[75] Inventor: Pieter A. Vlaar, Alkmaar, Netherlands

[73] Assignee: The Megaprint Group Ltd., United Kingdom

[21] Appl. No.: 995,749

[22] Filed: Dec. 18, 1992

[30] Foreign Application Priority Data

Nov. 6, 1992 [EP] European Pat. Off. ......... 92310188.5

[51] Int. Cl.⁵ .................................................. G09C 1/02
[52] U.S. Cl. ........................................ 380/56; 380/54; 380/57; 283/17; 283/73
[58] Field of Search ............... 380/56, 57, 54; 283/73, 283/17

[56] References Cited

U.S. PATENT DOCUMENTS

| | | | |
|---|---|---|---|
| 1,311,457 | 7/1919 | Nicolletti | 380/56 |
| 1,509,929 | 9/1924 | Caballero | 380/57 |
| 4,870,683 | 9/1989 | Atalla | 380/56 |

Primary Examiner—Gilberto Barrón, Jr.
Attorney, Agent, or Firm—Silverman, Cass & Singer, Ltd.

[57] ABSTRACT

A method of encrypting a sequence of characters such as a code number on an information slide or disc is provided. The method allows the encryption of a plurality of sequences on a single user-markable disc or slide which may be deciphered by a reference to a single code word.

7 Claims, 2 Drawing Sheets

INFORMATION-ENCRYPTING DEVICE AND METHOD

The present invention relates to a device and method for encrypting a series of characters, such as a number or a word, in such a way that they be easily deciphered using a simple code word.

Devices for displaying information, which take the shape of slides or discs are known. Typically such devices will comprise a movable element upon which information is printed, which is slidably or rotatably affixed to a cover element which comprises windows through which the information may be read. It is a useful feature of such devices that the particular positioning of windows will allow relevant items of information to be displayed simultaneously.

In a particular embodiment of such information discs or slides, the movable element may be printed with an index marker or a series of such markers which are alignable with markers on the cover element. Aligning two particular markers will lead to a specific item of information being displayed in a window of the cover element. For example, where the device is a bus routefinder, the alignment of markers representing the location of a traveller and his intended destination will cause a preferred bus route to be displayed in a window.

Such devices are well adapted for the selective presentation of prerecorded information. They are not suitable, however, for the recordal of information by the user. Furthermore, they are not suitable for the encrypting and deciphering of coded information by the user.

The storage and retrieval of information is becoming of increasing relevance in modern times. It is common for an individual to possess a device for recording information, such as a diary or a looseleaf file in which information may be written. A particular disadvantage of such devices, however, is that the information recorded therein is accessible to any person who should come into possession of the device. Sensitive information cannot therefore be recorded without running the risk that an unauthorised person may appropriate it. In particular, an individual may wish to record the identification numbers pertaining to the various credit and charge cards he possesses. Such identification numbers, known as PINs are essential if the card is to be used in automated bank tellers and cash machines, petrol pumps, telephones and the like. If the number is infrequently used, it may be necessary for the user to record it, since he may not be able to memorise it.

The banks who issue credit and charge cards and who indemnify their customers against abuse of these cards forbid customers to record PINs in a way which renders them accessible to an unauthorised person. Furthermore, some banks will refuse to indemnify customers if it can be proven that the PIN was so recorded.

Electronic diaries and pocket personal computers are known, some of which are capable of storing information in a protected manner, such that it can only be retrieved if a password is known. Such devices, however, are bulky, complex and expensive.

There is therefore a need for a method of encoding information, in particular four-figure PINs, in such a manner that it is completely indecipherable to a person who is not in possession of the code. This need has been fulfilled by the present invention, in which the principles of the information slide or disc have been developed to allow the encrypting of a series of integers such as letters or numbers.

In a first aspect of the present invention, we provide a method for encrypting a sequence of characters using a disc or slide comprising a cover element having a plurality of windows with a first set of characters depicted adjacent to a first window and having a user-markable grid and a moveable element the surface of which is viewable through the windows of the cover element and depicts a second set of characters which are viewable through a second window, which method comprises the steps of: (a) aligning an index marker with the first character of a code sequence selected from the first set of characters; (b) marking the grid at a position which indicates the identity of a first character of the second set of characters forming part of the sequence to be encrypted; (c) repeating steps (a) and (b) in respect of second and/or further characters of the code sequence and the sequence to be encrypted.

It will be understood that a window may be formed in the cover element by any means. For example, a section at the edge of the element may simply be recessed, revealing the movable element beneath. Alternatively, a section of the cover element may be cut out and removed from the central region thereof, exposing the movable element.

If the invention is performed on a disc, the movable element may be affixed to the cover element in a central region thereof by means of a rivet or the like which extends coaxially through both elements. Preferably, however, the cover element will comprise an envelope which encloses the movable element and supports it at its periphery, such that it is rotatable therein.

If the invention is performed on a slide, as is especially preferred, the cover element is preferably in the form of an open-ended envelope in which the movable element may slide. A preferred slide or disc for use with the present invention is described in European Patent 0 142 892, published on 29th May 1985.

Preferably, the slide will be of a similar length and width as a credit card, and advantageously as thin as possible.

Preferably, the first set of characters will comprise letters of an alphabet, while the second set of characters will comprise numerals. This arrangement is particularly preferred where the slide or disc is to be used for encrypting a credit or charge card PIN. Most preferably, the first set of characters will consist of the Roman alphabet A to Z inclusive, while the second set of characters will consist of arabic numerals from 0 to 9 inclusive.

Advantageously, the cover element is printed with more than one grid. Each grid allows a separate number to be encrypted. Preferably, the cover element comprises a flap upon which extra grids are printed. The grid will advantageously comprise ten subdivisions along a first axis which are alignable with the second set of characters printed on the movable element. Preferably, the grid will further comprise four subdivisions along a second axis, which will allow a four-figure number to be encrypted. The number of subdivisions on the second axis corresponds directly to the number of figures in the number which can be encrypted. Where more than one grid is present, it will be understood that the subdivisions along each first axis on each grid will be alignable with the second set of characters.

In a second embodiment of the invention, we provide a method of deciphering a sequence of characters encrypted by the method of any preceding claim comprising the steps of: (a) aligning the index marker with a first character of the code sequence selected from the first set of characters; (b) translating the position of a mark entered on the user-markable grid into the identity of a first character of the encrypted sequence selected from the second set of characters; and (c) repeating steps (a) and (b) in respect of second and/or further characters of the code sequence until the encrypted sequence has been deciphered.

The invention will now be described, by way of example only, with reference to the following drawings of a slide for use in the method of the invention, in which.

Figure 1:
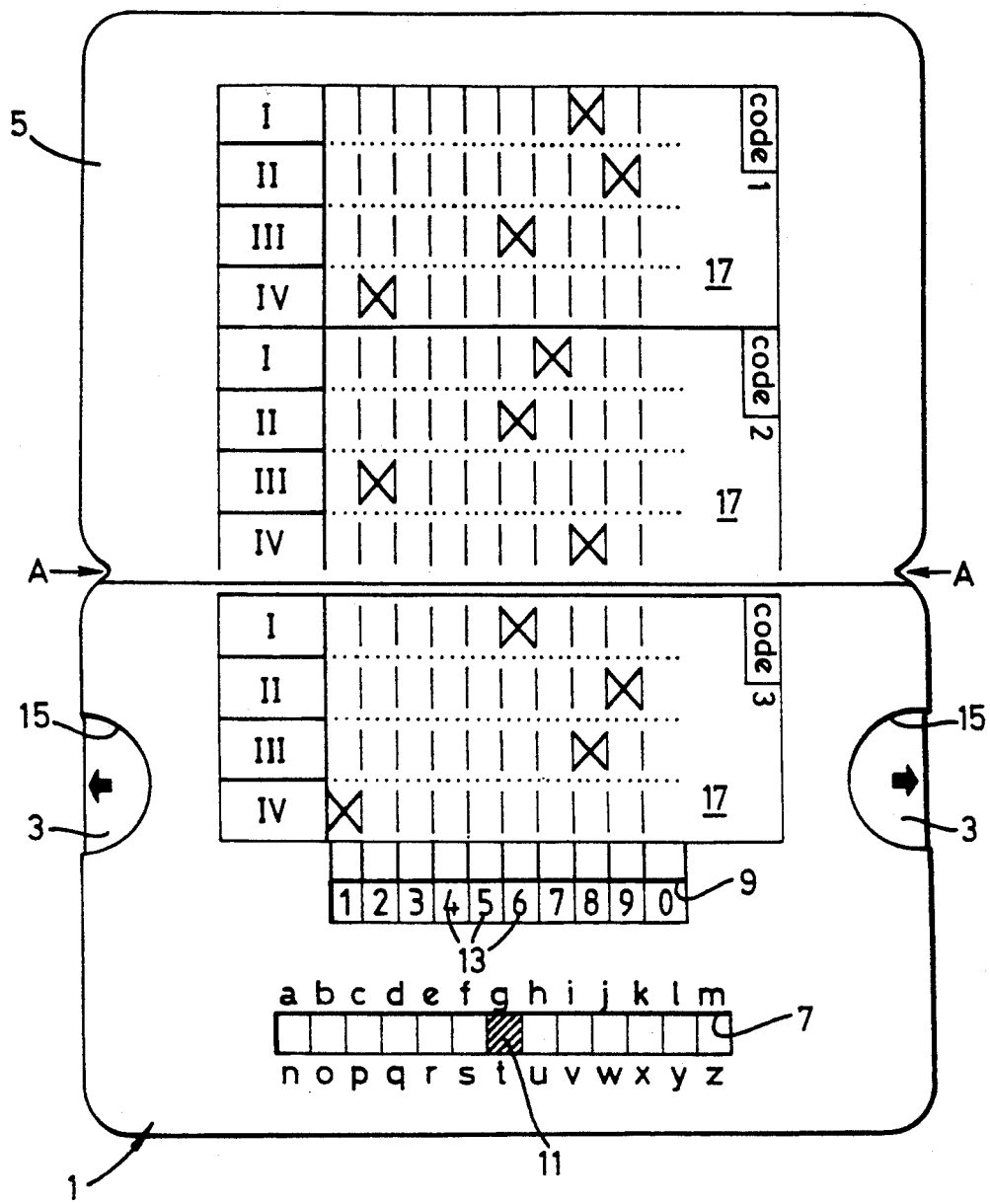
FIG. 1 is a plan view of the slide.

Referring to the drawings the slide is comprised of an envelope 1 which contains a slidable card 3, and a flap 5. The flap 5 is foldable about axis A—A to overlap the envelope 1.

Envelope 1 is provided with windows 7 and 9, through which are visible index marker 11 and numerals 13 respectively, which are printed on the slidable card 3. Two recesses 15 in the envelope 1 allow the slidable card 3 to be gripped and moved as required.

The envelope 1 and flap 5 are printed with grids 17, the columns of which are aligned with numerals 13. Each grid 17 has four rows, marked with Roman numerals I to IV.

Figure 2:
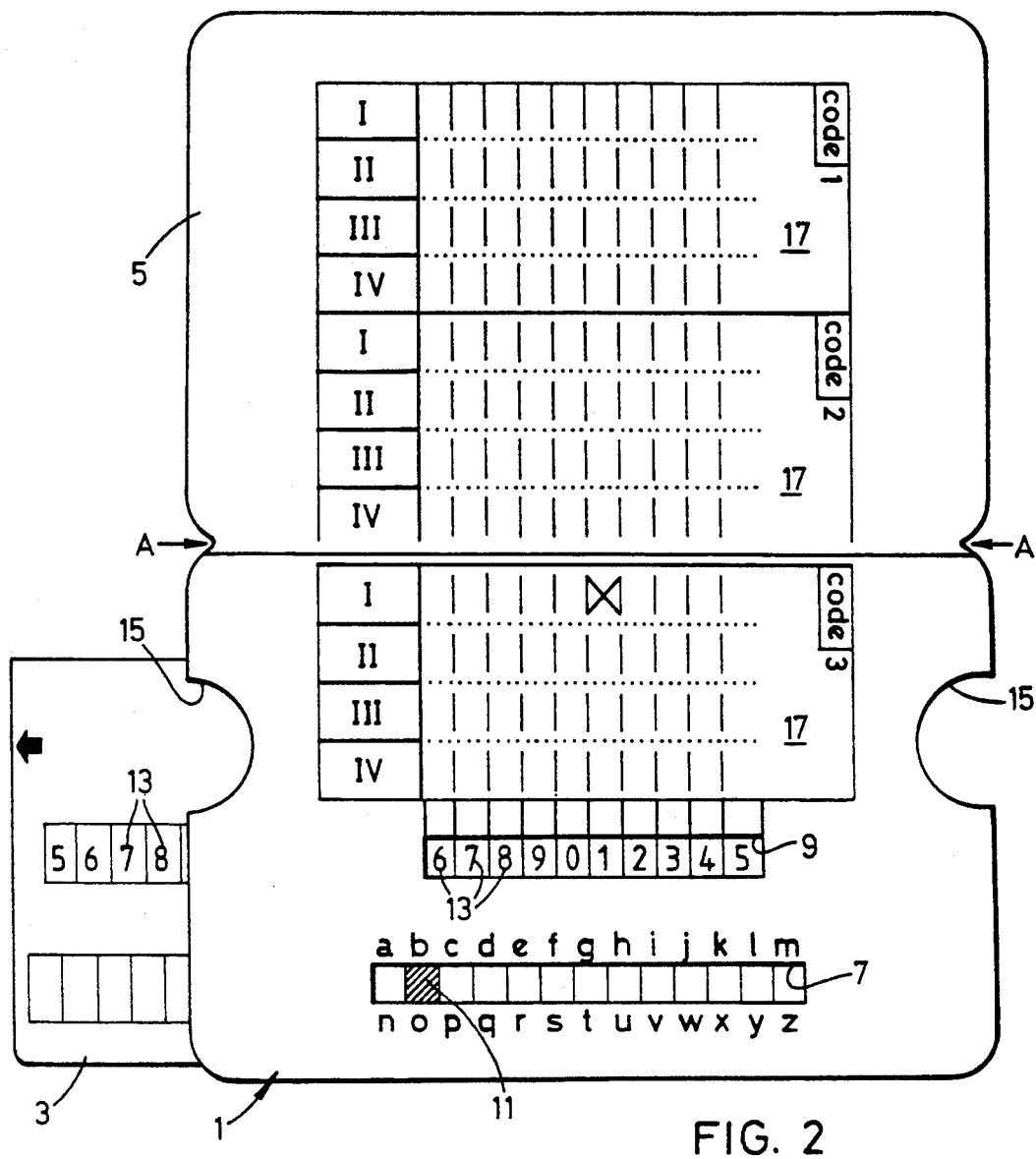
FIG. 2 is a plan view of the slide with the movable element in a different position to that shown in FIG. 1.
Figure 3:
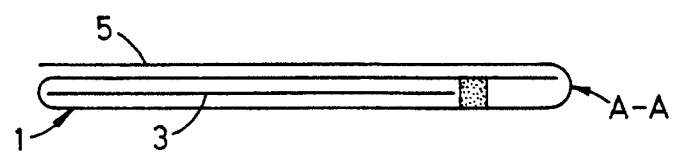
FIG. 3 is a transverse sectional view of the slide of FIG. 1, folded along the line A—A.

In order to encode a four-figure credit card PIN, a four-letter code word is first chosen, which can be easily remembered by the user. The slidable card 3 is then moved until the index marker 11 is adjacent to the first letter of the chosen code word. A mark is then entered on one grid in the row corresponding to the first figure of the number, which is marked I, in the column which is aligned with the first figure itself appearing in the numerals 13. For example, if the chosen code word is "BRIL" and the number to be encoded is 1166, a mark is entered in the row marked I and the column corresponding to the numeral 1 when the index marker is aligned with the letter B. This is shown in FIG. 2. The procedure is then repeated for the remaining figures of the number, aligning the index marker with each successive letter of the code word and entering a mark in the appropriate row and column.

Second and third four-figure numbers can be encoded on the remaining grids, using the same code word.

In order to decode the encrypted number, one must remember the code word. The index marker is aligned with each successive letter thereof, and the digits of the encrypted number are read off the device according to the position of the marks entered on the grid relative to the numerals printed on the movable element and the roman numbers I to IV.

It will be understood that the invention is described above by way of example only, and that modifications of detail may be made within the scope of the invention.

I claim:

1. A method for encrypting a sequence of characters using a disc or slide comprising a cover element having a plurality of windows with a first set of characters depicted adjacent to a first window and having a user-markable grid, and a moveable element the surface of which is viewable through the windows of the cover element and depicts a second set of characters which are viewable through a second window, which method comprises the steps of:

(a) aligning an index marker with the first character of a code sequence selected from the first set of characters;

(b) marking the grid at a position which indicates the identity of a first character of the second set of characters forming part of the sequence to be encrypted;

(c) repeating steps (a) and (b) in respect of second and/or further characters of the code sequence and the sequence to be encrypted.

2. A method according to claim 1 wherein the first set of characters comprises letters of an alphabet and the second set of characters comprises numerals.

3. A method according to claim 2 wherein the first set of characters consists of the letters A to Z of the roman alphabet and the second set of characters consists of the arabic numerals 0 to 9.

4. A method according to any preceding claim wherein the user-markable grid comprises ten subdivisions along a first axis which is alignable with the second set of characters, and four subdivisions along a second axis.

5. A method according to claim 1 wherein the provision of a plurality of user-markable grids allows the encrypting of more than one sequence of characters.

6. A method according to claim 1 wherein the code sequence is a code word and the sequence to be encrypted is a number.

7. A method of deciphering a sequence of characters encrypted by the method of claim 1 comprising the steps of:

(a) aligning the index marker with a first character of the code sequence selected from the first set of characters;

(b) translating the position of a mark entered on the user-markable grid into the identity of a first character of the encrypted sequence selected from the second set of characters; and (c) repeating steps (a) and (b) in respect of second and/or further characters of the code sequence until the encrypted sequence has been deciphered.

* * * * *